(12) United States Patent
Odendall

(10) Patent No.: US 7,305,818 B2
(45) Date of Patent: Dec. 11, 2007

(54) METHOD FOR ACTUATING AN ACCUMULATOR CATALYST FOR NITROGEN DIOXIDE ON AN INTERNAL COMBUSTION ENGINE FOR A VEHICLE, IN PARTICULAR A CAR

(75) Inventor: Bodo Odendall, Neuburg (DE)

(73) Assignee: Audi AG (DE)

( * ) Notice: Subject to any disclaimer, the term of this patent is extended or adjusted under 35 U.S.C. 154(b) by 40 days.

(21) Appl. No.: 10/543,110

(22) PCT Filed: Jan. 17, 2004

(86) PCT No.: PCT/EP2004/000336

§ 371 (c)(1),
(2), (4) Date: Jul. 22, 2005

(87) PCT Pub. No.: WO2004/065771

PCT Pub. Date: Aug. 5, 2004

(65) Prior Publication Data

US 2006/0185350 A1    Aug. 24, 2006

(30) Foreign Application Priority Data

Jan. 22, 2003  (DE)  ............... 103 02 244

(51) Int. Cl.
*F01N 3/00* (2006.01)
(52) U.S. Cl. ............ 60/285; 60/274; 60/297; 60/301

(58) Field of Classification Search ......... 60/274, 60/276, 285, 295, 297, 301
See application file for complete search history.

(56) References Cited

U.S. PATENT DOCUMENTS

| | | | | |
|---|---|---|---|---|
| 5,894,725 | A * | 4/1999 | Cullen et al. | 60/274 |
| 6,148,612 | A * | 11/2000 | Yamashita et al. | 60/277 |
| 6,263,668 | B1 * | 7/2001 | Yamashita et al. | 60/301 |
| 6,408,615 | B1 * | 6/2002 | Hahn | 60/274 |
| 6,463,734 | B1 * | 10/2002 | Tamura et al. | 60/277 |
| 6,718,756 | B1 * | 4/2004 | Okada et al. | 60/286 |
| 2001/0011454 | A1 | 8/2001 | Pfleger et al. | |

FOREIGN PATENT DOCUMENTS

| | | |
|---|---|---|
| DE | 100 64 665 | 8/2002 |
| EP | 1 298 302 | 4/2003 |

* cited by examiner

*Primary Examiner*—Binh Q. Tran
(74) *Attorney, Agent, or Firm*—Stevens, Davis, Miller & Mosher, LLP

(57) ABSTRACT

A first range of operation for an accumulator catalyst in a vehicle is carried out in a poor operating mode when the engine is supplied with a lean mixture and nitrogen oxide contained in the exhaust gas is stored in the accumulator catalyst for nitrogen dioxide. In order to remove nitrogen dioxide from said accumulator catalyst for nitrogen dioxide at a determined switching moment when a given switching condition is achieved, an engine control unit switches the poor-operating mode into a rich operating mode.

7 Claims, 1 Drawing Sheet

METHOD FOR ACTUATING AN ACCUMULATOR CATALYST FOR NITROGEN DIOXIDE ON AN INTERNAL COMBUSTION ENGINE FOR A VEHICLE, IN PARTICULAR A CAR

This application is a § 371 application of PCT/EP2004/000336, which claims priority from WO 2004/065771.

BACKGROUND

The invention relates to a method for actuating an accumulator catalyst for nitrogen dioxide on an internal combustion engine for a vehicle, in particular a car.

In current automotive engineering spark ignition engines as internal combustion engines with direct gasoline injection instead of conventional manifold injection are preferred, since these internal combustion engines, compared to conventional spark ignition engines, have clearly more dynamics, are superior with respect to torque and output, and at the same time makes possible a reduction in fuel consumption by up to 15%. This makes possible so-called stratification in the partial load range in which an ignitable mixture is required only in the area of the spark plug, while the remaining combustion chamber is filled with air. Since conventional internal combustion engines, which work according to the manifold principle, at such a high air excess as prevails in direct gasoline injection can no longer be ignited, in this stratified mode the fuel mixture is concentrated around the spark plug which is positioned centrally in the combustion chamber, while in the edge areas of the combustion chamber there is pure air. In order to be able to center the fuel mixture around the spark plug which is positioned centrally in the combustion chamber, a concerted air flow in the combustion chamber is necessary, a so-called tumble flow. In the process an intensive, roller-shaped flow is formed in the combustion chamber and the fuel is injected only in the last third of the upward motion of the piston. By the combination of the special air flow and the dedicated geometry of the piston which has for example a pronounced fuel and flow depression, the especially finely atomized fuel is concentrated in a so-called "mixture ball" optimally around the spark plug and reliably ignites. The engine control provides for the respectively optimized adaptation of the injection parameters (injection time, fuel pressure).

These internal combustion engines can therefore be operated in lean operation for a correspondingly long time; this has a beneficial effect on fuel consumption overall, as has been described in the foregoing. This lean operation however entails the disadvantage of a much larger amount of nitrogen oxide in the exhaust gas so that the nitrogen oxides (NOx) can no longer be completely reduced in the lean exhaust gas of a 3-way catalyst. In order to keep the nitrogen oxide emissions within the scope of prescribed limits, for example of the Euro-IV limit value, nitrogen oxide storage catalysts are generally used in conjunction with these internal combustion engines. These nitrogen oxide storage catalysts are operated such that the large amounts of nitrogen oxides produced by the internal combustion engine are stored in them. With the increasing amount of stored nitrogen oxide a saturation state is reached in the nitrogen oxide storage catalyst so that the nitrogen oxide storage catalyst must be discharged. In the process, for a so-called discharge phase switching to substoichiometric, rich engine operation takes place briefly by means of the engine control or engine control device, in which the internal combustion engine is operated with a rich mixture which has an air deficit in order to achieve discharge of the nitrogen oxide. In this discharge process the stored nitrogen oxide is reduced by the hydrocarbons (HC) and carbon monoxides (C), which are present in large amounts under these rich operating conditions, to nitrogen ($N_2$) which can then be released into the environment.

According to a generally known, generic process for operating a nitrogen oxide storage catalyst of an internal combustion engine of a motor vehicle, there is a first operating range as the lean operating range in which the internal combustion engine is operated with a lean mixture and in which the nitrogen oxides contained in the exhaust gas flow are stored in a nitrogen oxide storage catalyst, to discharge the nitrogen oxide storage catalyst at a predeterminable switching instant when a predeterminable switching condition is satisfied by means of the control device switching taking place from the lean operating range to the rich operating range.

Specifically, for this purpose the discharge instant is computed by the engine control device using modeled values filed in the engine operating map. The problem in these model assumptions is however that the actual conditions often do not correspond to the modeled values and deviate from them. This is especially problematical when the modeled nitrogen oxide raw emission values which are included in the computation of the discharge instant in the exhaust flow do not agree with the actual nitrogen oxide raw emission values, especially the case being problematical in which the actual nitrogen oxide raw emission values are higher than the modeled nitrogen oxide raw emission values. Thus, deterioration of the actual nitrogen oxide raw emission values which is not detected by the model leads to a much earlier nitrogen oxide breakout of the nitrogen oxide storage catalyst. In these nitrogen oxide breakouts the required exhaust gas limit values are generally not complied with. To avoid this, there is a margin for the uncertainties with respect to the deterioration of the actual nitrogen oxide raw emission values which is not detected by the model in practical operation, i.e., a type of "safety interval" is dictated with respect to the predetermined exhaust gas limit values. But this margin results in that often discharge takes place at a time at which in fact a discharge did not need to be undertaken, since the storage potential of the storage catalyst is not fully used, i.e., overall more discharges than actually necessary will be carried out; this in turn increases fuel consumption in an undesirable manner.

Processes for modeling the actual conditions in a nitrogen oxide storage catalyst are known among others from EP 0 867 604 A1 in which the nitrogen oxide storage capacity is determined as a function of the temperature of the storage catalyst.

A process for operating a nitrogen oxide storage catalyst with a correction factor is known from EP 0 997 626 A1.

A model for computing the charging of a nitrogen oxide storage catalyst with nitrogen oxides and sulfur oxides is known from DE 100 38 461 A1.

Furthermore WO 02/14659 A1 discloses a process and a model for modeling the discharge phase of a nitrogen oxide storage catalyst in which an oxygen reservoir is modeled by a first integrator for oxygen and a nitrogen oxide reservoir is modeled by a second integrator for nitrogen oxides and the first integrator and the second integrator are subjected proportionally to the reducing agent mass flow according to a division factor, the division factor being determined depending on the oxygen reservoir contents and the nitrogen oxide reservoir contents of the nitrogen oxide storage catalyst.

SUMMARY OF THE INVENTION

The object of the invention is therefore to devise a process for operating a nitrogen oxide storage catalyst of an internal combustion engine of a vehicle, especially a motor vehicle, with which an operating mode of the nitrogen oxide storage catalyst which is optimized with respect to the fuel consumption is possible.

This object is achieved with the features specified in claim 1.

To establish the instant of optimized switching from the lean operating range to the rich operating range for discharge of the nitrogen oxide storage catalyst, a discharge threshold as a function of the detected current nitrogen oxide tail pipe emission value is established, such that discharge of the nitrogen oxide storage catalyst is triggered if the emission values which are brought into a relation to one another show that the discharge threshold has been reached or exceeded.

Advantageously the process as claimed in the invention results in that the tail pipe emissions do not depend on the raw emissions, since the discharge threshold is influenced by consideration of the nitrogen oxide tail pipe emission values which are brought into a relationship to the modeled nitrogen oxide raw emission values in the exhaust gas flow, by the deviation of the actual nitrogen oxide raw emissions from the modeled nitrogen oxide raw emissions, such that an increase of the raw emissions leads to the still-catalyst-emissions emitted in absolute terms per unit of time not exceeding an absolute constant value. This advantageously results in that the tail pipe emission values regardless of the actual nitrogen oxide raw emission values do not exceed a predetermined exhaust gas limit value. Deterioration of the nitrogen oxide raw emission values is thus detected by way of the current nitrogen oxide tail pipe emission value and leads to the fact that in conjunction with the predetermined discharge threshold, discharge can be initiated at an instant at which the exhaust gas limit values are still being complied with. Thus, a margin as is the case in the operating model according to the generic, generally known prior art, is not necessary in this operating mode. Since the exhaust gas limit values are fixed values, optimum adaptation of the discharge threshold for different operating instants can be implemented especially easily and optimized with respect to fuel consumption.

It is especially preferred that the discharge of the nitrogen oxide storage catalyst is triggered when the current nitrogen oxide tail pipe emission value detected at the instant of switching reaches or exceeds a predeterminable percentage value relative to the modeled nitrogen oxide raw emission value at the instant of switching. It is especially preferred here that to determine the current nitrogen oxide tail pipe emission value the nitrogen oxide mass flow downstream of the nitrogen oxide storage catalyst is integrated over the current lean phase and/or that the modeled nitrogen oxide raw emission value is the integral of the modeled nitrogen oxide raw mass flow upstream of the nitrogen oxide storage catalyst over the same current lean phase.

(Integral of the currently detected nitrogen oxide tail pipe emission values/Integral of the modeled nitrogen oxide raw emission values) predeterminable percentage.

As already explained in the foregoing, in the process the percentage value is predetermined as a function of the exhaust gas limit value, the product of the predeterminable percentage value and the integral value of the modeled nitrogen oxide raw emission value establishing the discharge threshold. If the currently detected nitrogen oxide tail pipe emission value is greater than or equal to this product, discharging is initiated. The integrals are computed here over the lean phase.

This percentage value is at least 10%, preferably at least 5%.

In terms of device engineering, the nitrogen oxide tail pipe emission value can be detected preferably by a sensor device, preferably a nitrogen oxide sensor, which is located downstream of the nitrogen oxide storage catalyst viewed in the exhaust gas flow direction.

The invention will be described in detail below using a drawing.

BRIEF DESCRIPTION OF THE DRAWINGS

The single FIGURE schematically shows the amount of nitrogen oxide plotted over time.

DETAILED DESCRIPTION OF THE INVENTION

Figure 1:
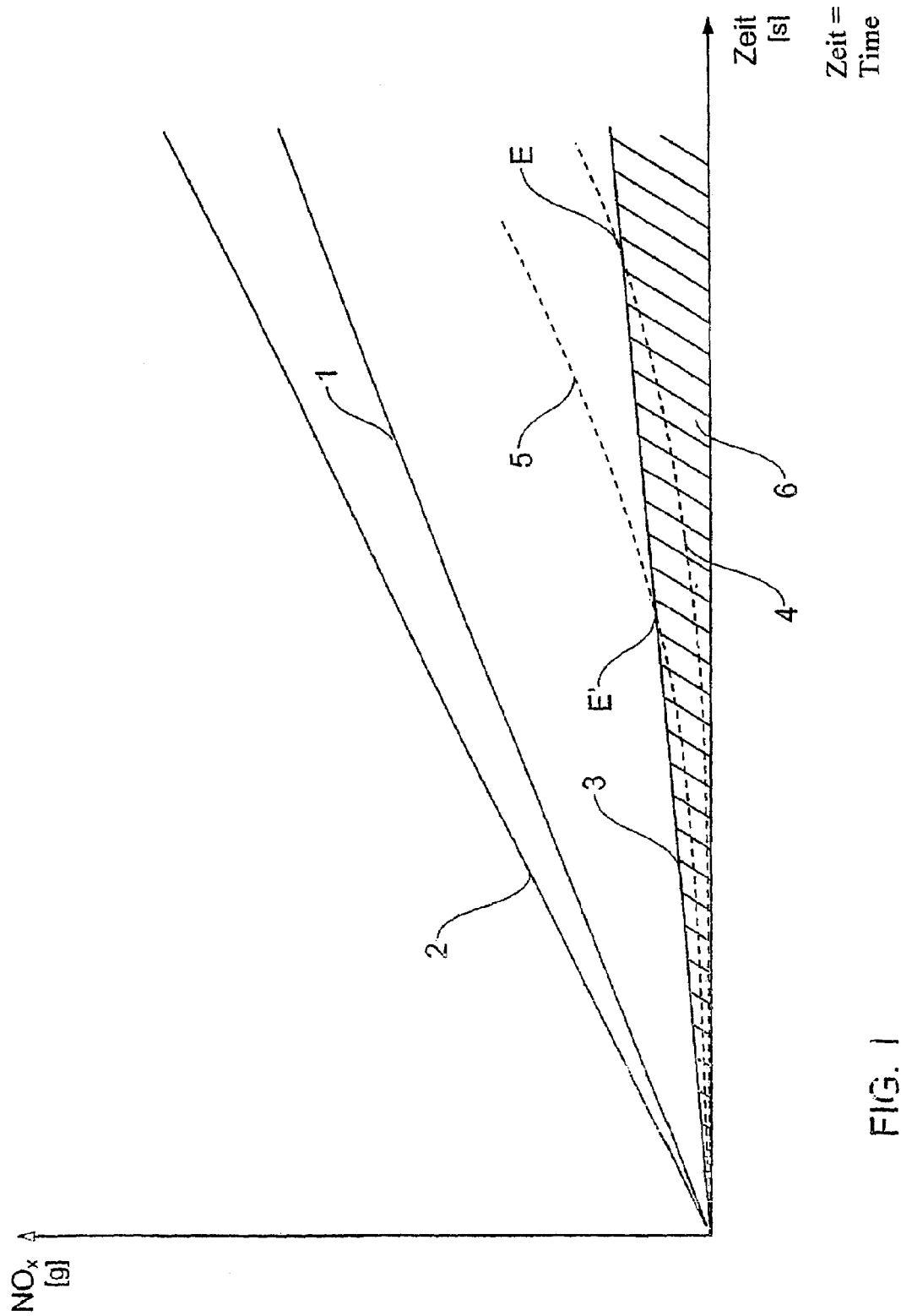

Curve 1 plots the time integral of the modeled nitrogen oxide raw emission amount upstream of the nitrogen oxide storage catalyst. This curve 1 is stored in the characteristics map and is available to the engine control device at any time. Since modeling of the nitrogen oxide raw emissions during the service life of the vehicle is subject to a plurality of error sources which make a precise computation of the raw emissions difficult, in actual vehicle operation the actual raw emission values as are shown by curve 2 arise.

In order to establish a discharge or switching instant which is independent of raw emissions, to determine an optimized switching instant from a lean operating range to a rich operating range for discharge of the nitrogen oxide storage catalyst, a discharge threshold is established as a function of the modeled nitrogen oxide raw emission values in the exhaust gas flow and as a function of the detected current nitrogen oxide tail pipe emission values. For this purpose, a discharge threshold 3 is established, here for example 0.05 of the modeled nitrogen oxide raw emission values, the value of 0.05 resulting from a percentage value of 5%, which in turn is derived from a predetermined exhaust gas limit value. That is to say, a maximum 5% of the integral of the raw emissions are emitted and curve 3 represents this 5% of the modeled raw emissions.

In FIG. 1 the broken-line curve which reproduces as a time integral the current nitrogen oxide tail pipe emission values which are measured downstream of the nitrogen oxide storage catalyst is designated as 4. As soon as this curve reaches or exceeds the discharge threshold 3, which is shown as the intersection point E in FIG. 1, the engine control device initiates a discharge since the following switching condition is satisfied:

(Integral of the currently detected nitrogen oxide tail pipe emission values/Integral of the modeled nitrogen oxide raw emission values) 0.05

If it is assumed that the tail pipe curve 4 is those tail pipe emissions in which the actual values are equal to the modeled nitrogen oxide raw emission values, for the case in which the actual raw emission values or amounts as shown in FIG. 2 are above the modeled raw emission values or amounts according to curve 1, the broken-line tail pipe curve 5 is formed for which the discharge instant E' is reached earlier than in conjunction with the tail pipe curve 4. Since the discharge threshold 3 however is established depending on the modeled raw emissions, in operation the case always arises that a discharge is always carried out when the integral of the tail pipe emissions is greater than 5% of the modeled raw emissions. This ensures that the tail pipe emissions do not exceed a value of 5% of the model raw emission and thus remain independent of the actual raw emissions. Thus an operating mode of the nitrogen oxide storage catalyst and thus of the internal combustion engine can be achieved in which the exhaust gas limit values are complied with regardless of the actual raw emissions and with which operation is possible which is optimized with respect to fuel consumption.

The possible discharge region is shown by the broken line in FIG. 1 and is designated as reference numeral 6.

The invention claimed is:

1. Method for actuating an accumulator catalyst for nitrogen dioxide on an internal combustion engine for a vehicle, comprising:
   operating the engine in a first operating range as the lean operating range with a lean mixture and in which the nitrogen oxides contained in the exhaust gas flow are stored in a nitrogen oxide storage catalyst, to discharge the nitrogen oxide storage catalyst at a predeterminable switching instant when a predetermined switching condition is satisfied by means of the engine control device switching taking place from the lean operating range to the rich operating range,
   determining an instant of optimized switching from the lean operating range to the rich operating range for discharge of the nitrogen oxide storage catalyst, a discharge threshold is established as a function of a modeled nitrogen oxide raw emission value in the exhaust gas flow and as a function of the detected current nitrogen oxide tail pipe emission value such that discharge of the nitrogen oxide storage catalyst is triggered if the emission values which are brought into a relation to one another indicate that the discharge threshold has been reached or exceeded,
   wherein the discharge of the nitrogen oxide storage catalyst is triggered if the current nitrogen oxide tail pipe emission value detected at the instant of switching reaches or exceeds a predeterminable percentage value relative to the modeled nitrogen oxide raw emission value at the instant of switching, and
   determining the current nitrogen oxide tail pipe emission value of the nitrogen oxide mass flow downstream of the nitrogen oxide storage catalyst is integrated over the current lean phase,
   wherein the modeled nitrogen oxide raw emission value is the integral of the modeled nitrogen oxide raw mass flow upstream of the nitrogen oxide storage catalyst over the same current lean phase,
   wherein a discharge is carried out when the following switching condition is met at the switching instant:
   (Integral of the currently detected nitrogen oxide tail pipe emission values/Integral of the modeled nitrogen oxide raw emission values) X predeterminable percentage,
   the percentage value being predetermined as a function of the exhaust gas limit value, and the product of the predetermined percentage value and the integral value of the modeled nitrogen oxide raw emission values defining the switching threshold.

2. The method as claimed in claim 1, wherein the percentage value is at least 10%.

3. The method as claimed in claim 1, wherein the nitrogen oxide tail pipe emission value is detected preferably by a sensor device, preferably a nitrogen oxide sensor, which is located downstream of the nitrogen oxide storage catalyst viewed in the exhaust gas flow direction.

4. The method as claimed in claim 1, wherein the internal combustion engine is located in a car.

5. The method as claimed in claim 2, wherein the percentage value is at least 5%.

6. The method as claimed in claim 1, wherein the nitrogen oxide tail pipe emission value is detected preferably by a sensor device, preferably a nitrogen oxide sensor, which is located downstream of the nitrogen oxide storage catalyst viewed in the exhaust gas flow direction.

7. The method as claimed in claim 1, wherein the internal combustion engine is located in a car.

* * * * *